(12) United States Patent
Yagi et al.

(10) Patent No.: US 9,034,961 B2
(45) Date of Patent: May 19, 2015

(54) RUBBER COMPOSITION AND TIRE USING THE SAME

(71) Applicants: Reiko Yagi, Kodaira (JP); Kumi Fujiki, Kodaira (JP); Tetsuo Takano, Wakayama (JP); Masaaki Tsuchihashi, Wakayama (JP)

(72) Inventors: Reiko Yagi, Kodaira (JP); Kumi Fujiki, Kodaira (JP); Tetsuo Takano, Wakayama (JP); Masaaki Tsuchihashi, Wakayama (JP)

(73) Assignees: BRIDGESTONE CORPORATION, Tokyo (JP); KAO CORPORATION, Tokyo (JP)

( * ) Notice: Subject to any disclaimer, the term of this patent is extended or adjusted under 35 U.S.C. 154(b) by 0 days.

(21) Appl. No.: 14/352,488

(22) PCT Filed: Oct. 18, 2012

(86) PCT No.: PCT/JP2012/076957
§ 371 (c)(1),
(2) Date: Apr. 17, 2014

(87) PCT Pub. No.: WO2013/058320
PCT Pub. Date: Apr. 25, 2013

(65) Prior Publication Data
US 2014/0323627 A1 Oct. 30, 2014

(30) Foreign Application Priority Data

Oct. 18, 2011 (JP) .................................. 2011-228683

(51) Int. Cl.
| | |
|---|---|
| *C04B 24/22* | (2006.01) |
| *C08K 3/34* | (2006.01) |
| *C08K 5/17* | (2006.01) |
| *B60C 1/00* | (2006.01) |
| *C08K 3/36* | (2006.01) |
| *C08K 5/54* | (2006.01) |
| *C08L 7/00* | (2006.01) |
| *C08L 9/00* | (2006.01) |

(52) U.S. Cl.
CPC ... *C08K 5/17* (2013.01); *B60C 1/00* (2013.01); *C08K 3/36* (2013.01); *C08K 5/54* (2013.01); *C08L 7/00* (2013.01); *C08L 9/00* (2013.01); *B60C 1/0016* (2013.01); *B60C 1/0025* (2013.01); *B60C 1/0041* (2013.01); *B60C 2001/005* (2013.01)

(58) Field of Classification Search
CPC ............. C08L 9/00; C08L 7/00; C08L 71/02; B60C 1/0041; B60C 1/0025; B60C 1/0016; B60C 1/00; B60C 2001/005; C08K 3/36; C08K 5/17; C08K 5/54
USPC .................................................. 524/247, 442
See application file for complete search history.

(56) References Cited

U.S. PATENT DOCUMENTS

| | | | |
|---|---|---|---|
| 5,714,533 A | 2/1998 | Hatakeyama et al. | |
| 6,559,209 B1 * | 5/2003 | Araki et al. ................... | 524/236 |
| 2009/0263660 A1 * | 10/2009 | Takeuchi et al. .............. | 428/407 |
| 2010/0298476 A1 | 11/2010 | Kulbaba et al. | |

FOREIGN PATENT DOCUMENTS

| | | |
|---|---|---|
| CN | 1196745 A | 10/1998 |
| JP | 46-1857 B1 | 1/1971 |
| JP | 51-109048 A | 9/1976 |
| JP | 56-4637 A | 1/1981 |
| JP | 4-122745 A | 4/1992 |
| JP | 5-9339 A | 1/1993 |
| JP | 5-261740 A | 10/1993 |
| JP | 2011-500899 A | 1/2011 |
| WO | 95/31888 A2 | 11/1995 |

* cited by examiner

*Primary Examiner* — William Cheung
(74) *Attorney, Agent, or Firm* — Sughrue Mion, PLLC

(57) ABSTRACT

In order to provide a rubber composition in which dispersibility of silica is improved and in which a viscosity of an unvulcanized rubber is lowered and a heat build-up improving effect of a vulcanized rubber is well exerted, and a tire prepared by using the rubber composition, the rubber composition is endowed with a constitution in which 100 parts by mass of at least one rubber component selected from natural rubber and/or diene base synthetic rubbers are compounded with 55 to 200 parts by mass of silica and 0.5 to 15 parts by mass of at least one of alkanolamines represented by the following Formula (I):

$$R_1 - N \begin{matrix} (CH_2CH_2O)_n H \\ (CH_2CH_2O)_m H \end{matrix} \qquad (I)$$

[in Formula (I), $R_1$ represents an alkyl group or an alkenyl group having 1 to 24 carbon atoms, and the above alkyl group and alkenyl group may be any of a linear group, a branched group and a cyclic group; m and n represent an average addition molar number, and m and n are numerical values which represent m+n=1 to 20].

11 Claims, No Drawings

RUBBER COMPOSITION AND TIRE USING THE SAME

CROSS REFERENCE TO RELATED APPLICATIONS

This application is a National Stage of International Application No. PCT/JP2012/076957 filed Oct. 18, 2012, claiming priority based on Japanese Patent Application No. 2011-228683 filed Oct. 18, 2011, the contents of all of which are incorporated herein by reference in their entirety.

TECHNICAL FIELD

The present invention relates to a rubber composition and a tire produced by using the same, more specifically to a rubber composition in which dispersibility of silica is improved and in which a viscosity of an unvulcanized rubber is lowered and heat build-up of a vulcanized rubber is improved as well, and a tire prepared by using the rubber composition.

BACKGROUND ART

In accordance with social demands to energy saving in recent years, silica is compounded so frequently as a filler which allows low heat build-up of a rubber composition for a tire to be consistent with a gripping property of a tire on a wet road surface for the purpose of saving fuel consumption of automobiles.

Silica used tends to cause coagulation of particles themselves by virtue of a hydrogen bond of a silanol group which is a surface functional group, and in order to improve dispersibility of silica in a rubber, a kneading time has to be long. Also, silica causes the defects that a Mooney viscosity of a rubber composition is raised due to its unsatisfactory dispersibility in a rubber and that the rubber composition is inferior in processability such as extrusion. Further, the surface of silica is acidic, and therefore silica involves the defects that it adsorbs thereon basic substances which are used as a vulcanization accelerator to prevent the rubber composition from being sufficiently vulcanized and that the storage modulus of the rubber composition is not enhanced. Accordingly, silica-compounded rubber compositions have so far been desired to be improved in processability and the like.

A rubber composition improved in an electrostatic property which is characterized by compounding 100 parts by weight of a rubber component containing 90 parts by weight or more of a diene base rubber with 30 to 120 parts by weight of a filler containing 40% by weight or more of a white filler such as silica and aluminum hydroxide and 0.2 to 8 parts by weight of a nonionic surfactant or specific phosphoric acid ester has so far been known as technology for improving various properties and the like in a silica-compounded rubber composition (refer to, for example, patent document 1 filed by the present applicants).

However, the purpose of the patent document 1 described above is to reduce a volume resistance value and inhibit generation of static electricity to improve an electrostatic property, and it is neither described, suggested nor indicated therein to improve dispersibility of silica in the rubber composition, to lower a viscosity of an unvulcanized rubber and to improve as well heat build-up of a vulcanized rubber as is the case with the present invention. Further, it is shown in the examples thereof that an addition amount of silica is as small as 50 parts by mass or less at most, and the above patent document 1 is different in a technical concept from the present invention.

PRIOR ART DOCUMENTS

Patent Document

Patent document 1: WO95/031888 (claims, examples and others)

OUTLINE OF THE INVENTION

Problems to be Solved by the Invention

In light of the problems on the conventional arts described above and the like, the present invention intends to solve them, and an object thereof is to provide a rubber composition in which dispersibility of silica is improved and in which a viscosity of an unvulcanized rubber is lowered and heat build-up of a vulcanized rubber can be improved as well, a tire prepared by using the above rubber composition, and a viscosity lowering method for an unvulcanized rubber.

Means for Solving the Problems

In light of the problems on the conventional arts described above and the like, intense studies repeated by the present inventors have resulted in finding that a rubber composition which meets the object described above, a tire prepared by using the same and a viscosity lowering method for an unvulcanized rubber are obtained by compounding at least one rubber component selected from natural rubber and/or diene base synthetic rubbers with a specific amount or more of silica and at least one of specific alkanolamines, and thus, the present invention has come to be completed.

That is, the present invention comprises the following items (1) to (11).

(1) A rubber composition prepared by compounding 100 parts by mass of at least one rubber component selected from natural rubber and/or diene base synthetic rubbers with 55 to 200 parts by mass of silica and 0.5 to 15 parts by mass of at least one of alkanolamines represented by the following Formula (I):

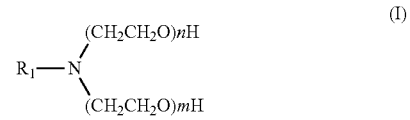

[in Formula (I), $R_1$ represents an alkyl group or an alkenyl group having 1 to 24 carbon atoms, and the alkyl group and alkenyl group may be any of a linear group, a branched group or a cyclic group; m and n represent an average addition molar number, and m and n are numerical values which represent $m+n=1$ to 20].

(2) The rubber composition as described in the above item (1), wherein the rubber composition is further compounded with a silane coupling agent.

(3) The rubber composition as described in the above item (2), wherein a compounding amount of the silane coupling agent is 1 to 20 parts by mass based on 100 parts by mass of silica.

(4) The rubber composition as described in any one of the above items (1) to (3), wherein a compounding amount of the alkanolamine is 0.5 to 20 parts by mass based on 100 parts by mass of silica.

(5) The rubber composition as described in any one of the above items (1) to (4), wherein R₁ has 11 to 18 carbon atoms, and m+n is 2 to 5.

(6) A tire using the rubber composition as described in any one of the above items (1) to (5) for a tire member.

(7) A viscosity lowering method for an unvulcanized rubber, wherein 100 parts by mass of at least one rubber component selected from natural rubber and/or diene base synthetic rubbers are compounded with 55 to 200 parts by mass of silica and 0.5 to 15 parts by mass of at least one of alkanolamines represented by the following Formula (I):

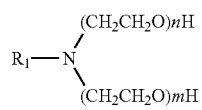

[in Formula (I), R₁ represents an alkyl group or an alkenyl group having 1 to 24 carbon atoms, and the alkyl group and alkenyl group may be any of a linear group, a branched group or a cyclic group; m and n represent an average addition molar number, and m and n are numerical values which represent m+n=1 to 20].

(8) The viscosity lowering method for an unvulcanized rubber as described in the above item (7), wherein the unvulcanized rubber is further compounded with a silane coupling agent.

(9) The viscosity lowering method for an unvulcanized rubber as described in the above item (8), wherein a compounding amount of the silane coupling agent is 1 to 20 parts by mass based on 100 parts by mass of silica.

(10) The viscosity lowering method for an unvulcanized rubber as described in any one of the above items (7) to (9), wherein a compounding amount of the alkanolamine is 0.5 to 20 parts by mass based on 100 parts by mass of silica.

(11) The viscosity lowering method for an unvulcanized rubber as described in any one of the above items (7) to (10), wherein R₁ has 11 to 18 carbon atoms, and m+n is 2 to 5.

Effects of the Invention

According to the present invention, provided are a rubber composition in which dispersibility of silica is improved and in which a viscosity of an unvulcanized rubber is lowered and heat build-up of a vulcanized rubber is improved as well, a tire prepared by using the rubber composition, and a viscosity lowering method for an unvulcanized rubber.

MODE FOR CARRYING OUT THE INVENTION

The embodiment of the present invention shall be explained below in detail.

The rubber composition of the present invention is prepared by compounding 100 parts by mass of at least one rubber component selected from natural rubber and/or diene base synthetic rubbers with 55 to 200 parts by mass of silica and 0.5 to 15 parts by mass of at least one of alkanolamines represented by the following Formula (I):

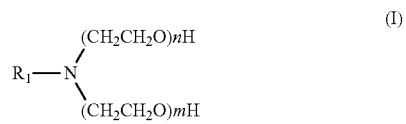

[in Formula (I), R₁ represents an alkyl group or an alkenyl group having 1 to 24 carbon atoms, and the alkyl group and alkenyl group may be any of a linear group, a branched group or a cyclic group; m and n represent an average addition molar number, and m and n are numerical values which represent m+n=1 to 20].

The rubber component used for the rubber composition of the present invention comprises natural rubber and/or a diene base synthetic rubber. In this connection, the diene base synthetic rubber includes polyisoprene rubber (IR), polybutadiene rubber (BR), styrene-butadiene copolymer rubber (SBR), butyl rubber (IIR), ethylene-propylene copolymers and the like. The rubber components may be used alone or in a blend of two or more kinds thereof.

The silica used for the rubber composition of the present invention shall not specifically be restricted, and commercial products used for rubber compositions can be used. Among them, wet silica (precipitated silica), dry silica (anhydrated silica), colloidal silica and the like can be used, and particularly wet silica is preferably used.

A compounding amount of the silica falls in a range of preferably 55 to 200 parts by mass, more preferably 55 to 150 parts by mass based on 100 parts by mass of the rubber component described above, and it falls in a range of further preferably 55 to 120 parts by mass, further more preferably 60 to 120 parts by mass and particularly preferably 70 to 100 parts by mass. Particularly in a case of the present invention, the effects of the present invention can be exerted even when a compounding amount of the silica is as high as 55 parts by mass or more based on 100 parts by mass of the rubber component.

A compounding amount of the silica is preferably 55 parts by mass or more based on 100 parts by mass of the rubber component described above from the viewpoint of lowering the hysteresis. On the other hand, it is preferably 200 parts by mass or less from the viewpoint of improving the workability.

In the present invention, a silane coupling agent is preferably used from the viewpoint of the reinforcing property.

The silane coupling agent which can be used shall not specifically be restricted and includes, for example, at least one of bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, 3-nitropropyldimethoxymethylsilane, 3-chloropyldimethoxymethylsilane, dimethoxymethylsilylpropyl-N,N-dimethylthiocarbamoyl tetrasulfide, dimethoxymethylsilylpropylbenzothiazole tetrasulfide and the like.

A compounding amount of the silane coupling agent is, though varied according to a compounding amount of the silica, preferably 1 part by mass or more based on 100 parts by mass of silica from the viewpoint of the effects exerted by adding the coupling agent, and on the other hand, from the viewpoint of maintaining the reinforcing property and the heat build-up, it is preferably 20 parts by mass or less. From the above viewpoints, the compounding amount falls in a range of further preferably 1 to 12 parts by mass, further more preferably 6 to 12 parts by mass.

In the present invention, carbon black can be used in combination as a reinforcing filler in addition to the silica described above.

The carbon black which can be used shall not specifically be restricted, and the grades of, for example, FEF, SRF, HAF, ISASF, SAF and the like can be used.

A compounding amount of the carbon blacks shall not specifically be restricted as well, and it is preferably 0 to 60 parts by mass, more preferably 10 to 50 parts by mass based on 100 parts by mass of the rubber component described above. It is preferably 60 parts by mass or less from the viewpoint of maintaining the heat build-up.

The alkanolamine represented by the following Formula (I) which is used in the present invention is compounded in order to lower a viscosity of the unvulcanized silica-compounded rubber and improve heat build-up of a vulcanized rubber to exert the effects of the present invention:

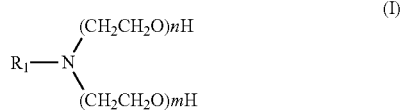

[in Formula (I), $R_1$ represents an alkyl group or an alkenyl group having 1 to 24 carbon atoms, and the alkyl group and alkenyl group may be any of a linear group, a branched group or a cyclic group; m and n represent an average addition molar number, and m and n are numerical values which represent m+n=1 to 20].

In Formula (I) described above, $R_1$ is an alkyl group or an alkenyl group having 1 to 24 carbon atoms, and the alkyl group and alkenyl group may have any of a linear group, a branched group or a cyclic group. It includes, for example, the alkyl group such as methyl, ethyl, propyl, isopropyl, butyl, isobutyl, t-butyl, pentyl, isopentyl, hexyl, isoheptyl, 2-ethylhexyl, octyl, isononyl, decyl, dodecyl, isotridecyl, tetradecyl, hexadecyl, isocetyl, octadecyl, isostearyl, docosyl and tetracosyl, and the alkenyl group such as allyl, 3-butenyl, methallyl, 2-methyl-3-butenyl, 3-methyl-3-butenyl, 1,1-dimethyl-2-propenyl, 4-pentenyl, oleyl and tetracosylidene (tetracosenyl). $R_1$ has preferably 6 or more carbon atoms from the viewpoint of the viscosity lowering effect, and it has preferably 18 or less carbon atoms from the viewpoint of compatibility between the cost for synthesis and the viscosity lowering effect. From the above viewpoints, $R_1$ is an alkyl group or an alkenyl group having further preferably 11 to 18 carbon atoms, further more preferably 14 to 18 carbon atoms, and the alkyl group and alkenyl group may have any of a linear group, a branched group or a cyclic group. It is preferably heptyl, 2-ethylhexyl, undecyl, tridecyl, pentadecyl, heptadecyl and heptadecenyl.

In Formula (I), m and n represent an average addition molar number, and m and n are numerical values which represent m+n=1 to 20. The term m+n is preferably 1.5 or more from the viewpoint of the interaction with the surface of silica, and it is preferably 10 or less from the viewpoint of maintaining the heat build-up. From the above viewpoints, the term m+n is more preferably 1.5 to 5, further preferably 1.5 to 3.5 and further more preferably 2 to 3.5. Also, m and n may be same or different, and preferably they each are independently positive numbers exceeding 0 and are more preferably 0.5 to 5, further preferably 0.5 to 2.5.

The alkanolamine represented by Formula (I) described above which can specifically be used includes, for example, at least one of POE (2) octylamine, POE (4) decylamine, POE (2) dodecylamine, POE (5) dodecylamine, POE (15) dodecylamine, POE (2) tetradecylamine, POE (2) hexadecylamine, POE (2) octadecylamine, POE (20) octadecylamine and POE (2) octadecenylamine (in this connection, POE (n) shows that polyoxyethylene is added in an amount of average n mole). Among them, POE (2) dodecylamine, POE (5) dodecylamine, POE (2) tetradecylamine, POE (2) hexadecylamine and POE (2) octadecenylamine are preferably used.

A synthetic process for the alkanolamine represented by Formula (I) described above is already known, and the alkanolamine can be obtained by various production processes. Also, commercial products may be used.

A compounding amount of at least one of the alkanolamines is preferably 0.5 to 15 parts by mass based on 100 parts by mass of the rubber component, and it is more preferably 1 to 15 parts by mass, further preferably 2 to 10 parts by mass and further more preferably 3 to 7 parts by mass from the viewpoint of further exerting the effects of the present invention. Also, a compounding amount of at least one of the alkanolamines is preferably 0.5 to 20 parts by mass, more preferably 0.5 to 15 parts by mass, further preferably 1 to 15 parts by mass, further more preferably 1 to 7 parts by mass and particularly preferably 2 to 6 parts by mass based on 100 parts by mass of silica.

When a compounding amount of at least one of the alkanolamines is 0.5 part by mass or more based on 100 parts by mass of the rubber component, the viscosity lowering effect on the unvulcanized rubber is high. On the other hand, when it is 20 parts by mass or less, a smaller influence is exerted on the rubber burning property, and the range is preferred.

The rubber composition of the present invention can be compounded, in addition to the rubber component, silica and the alkanolamine represented by Formula (I) each described above, with ingredients suitably selected from compounding ingredients usually used in the rubber industry, for example, antioxidants, softening agents, stearic acid, zinc oxide, vulcanization accelerators, vulcanization accelerator activators, vulcanizing agents and the like as long as the objects of the present invention are not disturbed. Commercial products can suitably be used as the above compounding ingredients.

The rubber composition of the present invention can be obtained by kneading, warming up and extruding the rubber component, silica, at least one of the alkanolamines described above and, if necessary, various compounding ingredients suitably selected by means of a mixer such as a mixing roll and an internal mixer. After mold processing, the rubber composition is vulcanized and can be used for applications to tire members of pneumatic tires, such as tire treads, under treads, carcasses, side walls and bead parts, and in addition thereto, it can be used as well for applications to industrial products and the like, such as rubber vibration insulators, belts, hoses and others.

The reasons why in the rubber composition thus constituted, dispersibility of silica is improved and a viscosity of an unvulcanized rubber is lowered and why heat build-up of a vulcanized rubber is improved as well are presumed as follows.

That is, it is presumed that in the rubber composition of the present invention, when at least one of the alkanolamines represented by Formula (I) is compounded with a mixture prepared by mixing 100 parts by mass of at least one rubber component selected from natural rubber and/or diene base synthetic rubbers with 55 to 200 parts by mass of silica, the surface of the silica is hydrophobized, whereby the silica particles are inhibited from being coagulated each other to lower a viscosity of an unvulcanized rubber and that the accelerator is inhibited from being adsorbed on the surface of the silica, whereby the heat build-up as well as the processability of the rubber composition can be improved.

Next, the tire of the present invention is obtained by a usual process using the rubber composition of the present invention. That is, the rubber composition of the present invention compounded, if necessary, with various compounding ingredients as described above is extruded and processed into a tire member, for example, a member for a tread at an unvulcanized stage, and the member is stuck on a tire under molding by a usual process on a tire building machine, whereby a green tire is molded. The green tire is heated and pressed in a vulcanizer to obtain a tire. Since the tire of the present invention thus obtained is excellent in low heat build-up, it is excellent in fuel consumption, and it is excellent as well in productivity because of good processability of the rubber composition.

Further, in the viscosity lowering method of an unvulcanized rubber according to the present invention, at least one of the alkanolamines represented by Formula (I) is compounded with a mixture prepared by mixing 100 parts by mass of at least one rubber component selected from natural rubber and/or diene base synthetic rubbers with 55 to 200 parts by mass of the silica, whereby the surface of the silica is hydrophobized, and therefore the silica particles are inhibited from being coagulated each other to lower a viscosity of an unvulcanized rubber.

The present invention further discloses the following compositions and processes with respect to the embodiment described above. The preferred embodiments and numerical ranges have been described above.

[1] A rubber composition prepared by compounding 100 parts by mass of at least one rubber component selected from natural rubber and/or diene base synthetic rubbers with 55 to 200 parts by mass, preferably 55 to 150 parts by mass, more preferably 60 to 120 parts by mass and further more preferably 70 to 100 parts by mass of silica and 0.5 to 15 parts by mass, preferably 1 to 15 parts by mass, more preferably 2 to 10 parts by mass and further more preferably 3 to 7 parts by mass of at least one of alkanolamines represented by the following Formula (I):

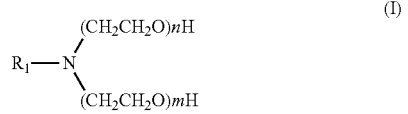

[in Formula (I), $R_1$ represents an alkyl group or an alkenyl group having 1 to 24 carbon atoms, preferably 6 to 18, more preferably 11 to 18 and further more preferably 14 to 18 carbon atoms, and the alkyl group and alkenyl group may be any of a linear group, a branched group and a cyclic group; m and n represent an average addition molar number, and m and n are numerical values which represent m+n=1 to 20, preferably 1.5 to 10, more preferably 1.5 to 5, further preferably 1.5 to 3.5 and further more preferably 2 to 3.5; m and n may be same or different, and preferably they each are independently positive numbers exceeding 0 and are more preferably 0.5 to 5, further preferably 0.5 to 2.5].

[2] The rubber composition as described in the above item [1], wherein the rubber composition is further compounded with a silane coupling agent.

[3] The rubber composition as described in the above item [2], wherein a compounding amount of the silane coupling agent is 1 to 20 parts by mass, preferably 1 to 12 parts by mass and more preferably 6 to 12 parts by mass based on 100 parts by mass of silica.

[4] The rubber composition as described in any one of the above items [1] to [3], wherein a compounding amount of the alkanolamine is 0.5 to 20 parts by mass, preferably 0.5 to 15 parts by mass, more preferably 1 to 15 parts by mass, further preferably 1 to 7 parts by mass and further more preferably 2 to 6 parts by mass based on 100 parts by mass of silica.

[5] The rubber composition as described in any one of the above items [1] to [4], wherein $R_1$ has 11 to 18 carbon atoms, and m+n is 2 to 5.

[6] A tire prepared by using the rubber composition as described in any one of the above items [1] to [5] for a tire member.

[7] A viscosity lowering method for an unvulcanized rubber, wherein 100 parts by mass of at least one rubber component selected from natural rubber and/or diene base synthetic rubbers are compounded with 55 to 200 parts by mass, preferably 55 to 150 parts by mass, more preferably 60 to 120 parts by mass and further more preferably 70 to 100 parts by mass of silica and 0.5 to 15 parts by mass, preferably 1 to 15 parts by mass, more preferably 2 to 10 parts by mass and further more preferably 3 to 7 parts by mass of at least one of alkanolamines represented by the following Formula (I):

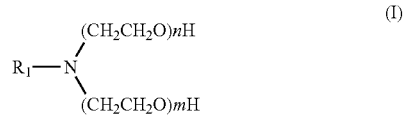

[in Formula (I), $R_1$ represents an alkyl group or an alkenyl group having 1 to 24 carbon atoms, preferably 6 to 18, more preferably 11 to 18 and further more preferably 14 to 18 carbon atoms, and the alkyl group and alkenyl group may be any of a linear group, a branched group or a cyclic group; m and n represent an average molar number, and m and n are numerical values which represent m+n=1 to 20, preferably 1.5 to 10, more preferably 1.5 to 5, further preferably 1.5 to 3.5 and further more preferably 2 to 3.5; m and n may be same or different, and preferably they each are independently positive numbers exceeding 0 and are more preferably 0.5 to 5, further preferably 0.5 to 2.5].

[8] The viscosity lowering method for an unvulcanized rubber as described in the above item [7], wherein the unvulcanized rubber is further compounded with a silane coupling agent.

[9] The viscosity lowering method for an unvulcanized rubber as described in the above item [7] or [8], wherein a compounding amount of the silane coupling agent is 1 to 20 parts by mass, preferably 1 to 12 parts by mass and more preferably 6 to 12 parts by mass based on 100 parts by mass of silica.

[10] The viscosity lowering method for an unvulcanized rubber as described in any one of the above items [7] to [9], wherein a compounding amount of the alkanolamine is 0.5 to 20 parts by mass, preferably 0.5 to 15 parts by mass, more preferably 1 to 15 parts by mass, further preferably 1 to 7 parts by mass and further more preferably 2 to 6 parts by mass based on 100 parts by mass of silica.

[11] The viscosity lowering method for an unvulcanized rubber as described in any one of the above items [7] to [10], wherein $R_1$ has 11 to 18 carbon atoms, and m+n is 2 to 5.

EXAMPLES

Next, the present invention shall be explained in further details with reference to examples and comparative examples, but the present invention shall by no means be restricted to the following examples.

Examples 1 to 6 and Comparative Examples 1 to 5

Rubber compositions were prepared according to recipes shown in Table 1 and Table 2 by an ordinary method. Numerical values in Table 1 and Table 2 are shown by mass parts.

The rubber compositions shown in Table 1 and Table 2 were used to measure a viscosity of unvulcanized rubbers by the following measuring method. The rubber compositions obtained were vulcanized at 160° C. for 14 minutes, and the vulcanized rubbers thus obtained were used to measure a viscoelasticity (tan δ) by the following measuring method.

Further, the rubber compositions shown in Table 2 were used to evaluate a discoloration property by the following evaluation method.

The results thereof are shown in the following Table 1 and Table 2.

Measuring Method of a Viscosity of Unvulcanized Rubbers:

The viscosity of the unvulcanized rubber was measured according to JIS K 6300-1:2001 (Mooney viscosity).

The evaluation results thereof were shown by indices, wherein the value obtained in Comparative Example 1 was set to 100 in Table 1, and the value obtained in Comparative Example 4 was set to 100 in Table 2. It is shown that the smaller the value of viscosity of the unvulcanized rubbers is, the better the workability is.

Measuring Method of Viscoelasticity (Tan δ):

A viscoelasticity measuring equipment (manufactured by Rheometric Corporation) was used to measure tan δ at a temperature of 50° C., a distortion of 5% and a frequency of 15 Hz, and the results thereof were shown by indices, wherein the value obtained in Comparative Example 1 was set to 100 in Table 1, and the value obtained in Comparative Example 4 was set to 100 in Table 2. It is shown that the smaller the above value is, the lower the heat build-up is, and the better the fuel consumption is.

Evaluation Method of Discoloration Property:

The rubber compositions shown in Table 2 were subjected to pressing cure at 160° C. for 20 minutes, and test pieces (thickness: 10 mm) were obtained from them and exposed outsides for 3 months, and then a discoloration property thereof was evaluated according to the following evaluation criteria.

Evaluation Criteria:
○: no change is observed
Δ: a little change is observed
X: apparent change is observed

TABLE 1

| | Comparative Example | | Example | | | |
|---|---|---|---|---|---|---|
| | 1 | 2 | 1 | 2 | 3 | 4 |
| S-SBR *1 | 137.5 | 137.5 | 137.5 | 137.5 | 137.5 | 137.5 |
| Carbon black *2 | 20 | 20 | 20 | 20 | 20 | 20 |
| Silica *3 | 80 | 80 | 80 | 80 | 80 | 80 |
| Silane coupling agent *4 | 8 | 8 | 8 | 8 | 8 | 8 |
| Stearic acid | 1 | 1 | 1 | 1 | 1 | 1 |
| Wax *5 | 2 | 2 | 2 | 2 | 2 | 2 |
| Antioxidant 6PPD *6 | 4 | 4 | 4 | 4 | 4 | 4 |
| Antioxidant TMQ *7 | 0.3 | 0.3 | 0.3 | 0.3 | 0.3 | 0.3 |
| Zinc oxide | 2.5 | 2.5 | 2.5 | 2.5 | 2.5 | 2.5 |
| Vulcanization accelerator DPG *8 | 0.8 | 0.8 | 0.8 | 0.8 | 0.8 | 0.8 |
| Vulcanization accelerator MBTS *9 | 0.8 | 0.8 | 0.8 | 0.8 | 0.8 | 0.8 |
| Vulcanization accelerator CBS *10 | 0.9 | 0.9 | 0.9 | 0.9 | 0.9 | 0.9 |
| Sulfur | 1.5 | 1.5 | 1.5 | 1.5 | 1.5 | 1.5 |
| Dimethylstearylamine *11 | | 5 | | | | |
| Alkanolamine 1 *12 | | | 5 | | | |
| Alkanolamine 2 *13 | | | | 5 | | |
| Alkanolamine 3 *14 | | | | | 5 | |
| Alkanolamine 4 *15 | | | | | | 5 |
| Viscosity of unvulcanized rubber | 100 | 90 | 87 | 88 | 86 | 88 |
| tan δ | 100 | 97 | 95 | 92 | 89 | 90 |

TABLE 2

| | Comparative Example | | | Example | |
|---|---|---|---|---|---|
| | 3 | 4 | 5 | 5 | 6 |
| S-SBR *1 | 137.5 | 137.5 | 137.5 | 137.5 | 137.5 |
| Carbon black *2 | 20 | 20 | 20 | 20 | 20 |
| Silica *3 | 50 | 50 | 55 | 55 | 55 |
| Silane coupling agent *4 | 8 | 8 | 8 | 8 | 8 |
| Stearic acid | 1 | 1 | 1 | 1 | 1 |
| Wax *5 | 2 | 2 | 2 | 2 | 2 |
| Antioxidant 6PPD *6 | 4 | 4 | 4 | 4 | 4 |
| Antioxidant TMQ *7 | 0.3 | 0.3 | 0.3 | 0.3 | 0.3 |
| Zinc oxide | 2.5 | 2.5 | 2.5 | 2.5 | 2.5 |
| Vulcanization accelerator DPG *8 | 0.8 | 0.8 | 0.8 | 0.8 | 0.8 |
| Vulcanization accelerator MBTS *9 | 0.8 | 0.8 | 0.8 | 0.8 | 0.8 |
| Vulcanization accelerator CBS *10 | 0.9 | 0.9 | 0.9 | 0.9 | 0.9 |
| Sulfur | 1.5 | 1.5 | 1.5 | 1.5 | 1.5 |
| Alkanolamine 1 *12 | 0 | 3 | 0 | 3.3 | 5 |
| Viscosity of unvulcanized rubber | 120 | 100 | 126 | 103 | 99 |
| tan δ | 110 | 100 | 115 | 102 | 100 |
| Discoloration property | ○ | X | ○ | ○ | Δ |

*1 to *15 in Table 1 and Table 2 show the followings.
*1: Tufdene 2830 (manufactured by Asahi Kasei Chemicals Corporation) (rubber component: 100 parts by mass, oil component: 37.5 parts by mass)
*2: SEAST 7HM (manufactured by Tokai Carbon Co., Ltd.)
*3: Nipsil VN3 (manufactured by Tosoh Silica Corporation)
*4: Bis(3-triethoxysilylpropyl) tetrasulfide
*5: Microcrystalline wax, Ozoace 0701 (manufactured by Nippon Seiro Co., Ltd.)
*6: NOCRAC 6C (manufactured by Ouchi Shinko Industrial Co., Ltd.)
*7: NONFLEX RD-S (manufactured by Seiko Chemical Co., Ltd.)
*8: NOCCELER D (manufactured by Ouchi Shinko Industrial Co., Ltd.)
*9: NOCCELER DM (manufactured by Ouchi Shinko Industrial Co., Ltd.)
*10: Sanceler CM-G (manufactured by Sanshin Chemical Industrial Co., Ltd.)
*11: FARMIN DM8098 (dimethylstearylamine, manufactured by Kao Corporation)
*12: Amiet 102 (POE (2) dodecylamine, manufactured by Kao Corporation)
*13: Amiet 105 (POE (5) dodecylamine, manufactured by Kao Corporation)
*14: Amiet 302 (POE (2) octadecylamine, manufactured by Kao Corporation)
*15: Amiet 320 (POE (20) octadecylamine, manufactured by Kao Corporation)

As apparent from the results shown in Table 1, it has been found from the evaluation results of the viscosity of the unvulcanized rubber and the viscoelasticity (tan δ) that the rubber compositions produced in Examples 1 to 4 falling in the scope of the present invention are improved in a viscosity lowering effect of an unvulcanized rubber and heat build-up of a vulcanized rubber as compared with the rubber compositions produced in Comparative Examples 1 to 2 falling outside the scope of the present invention.

Further, the respective rubber compositions shown in Table 2 were produced in Examples 6 to 7 and Comparative Examples 3 to 5 in order to clearly show the significance of a lower limit value of a compounding amount (55 parts by mass) of silica. As apparent from the results shown in Table 2, it has been found from the evaluation results of the viscosity of the unvulcanized rubber, the viscoelasticity (tan δ) and the discoloration property that the rubber compositions produced in Examples 5 to 6 falling in the scope of the present invention are improved in a viscosity lowering effect of an unvulcanized rubber and heat build-up of a vulcanized rubber and that the vulcanized rubber is reduced in discoloration with the passage of time as compared with the rubber compositions produced in Comparative Examples 3 to 5 falling outside the scope of the present invention.

INDUSTRIAL APPLICABILITY

The rubber compositions produced according to the present invention can be used for tire members of pneumatic tires, such as tire treads, under treads, carcasses, side walls and bead parts, and in addition thereto, they can suitably be used as well for rubber products, such as rubber vibration insulators, belts and hoses.

The invention claimed is:

1. A rubber composition prepared by compounding 100 parts by mass of at least one rubber component selected from natural rubber and/or diene base synthetic rubbers with 55 to 200 parts by mass of silica and 0.5 to 15 parts by mass of at least one of alkanolamines represented by the following Formula (I):

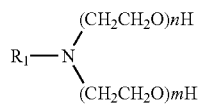

[in Formula (I), $R_1$ represents an alkyl group or an alkenyl group having 1 to 24 carbon atoms, and the alkyl group and alkenyl group may be any of a linear group, a branched group or a cyclic group; m and n represent an average addition molar number, and m and n are numerical values which represent m+n=1 to 20].

2. The rubber composition as described in claim 1, wherein the rubber composition is further compounded with a silane coupling agent.

3. The rubber composition as described in claim 2, wherein a compounding amount of the silane coupling agent is 1 to 20 parts by mass based on 100 parts by mass of silica.

4. The rubber composition as described in claim 1, wherein a compounding amount of the alkanolamine is 0.5 to 20 parts by mass based on 100 parts by mass of silica.

5. The rubber composition as described in claim 1, wherein $R_1$ has 11 to 18 carbon atoms, and m+n is 2 to 5.

6. A tire using the rubber composition as described in claim 1 for a tire member.

7. A viscosity lowering method for an unvulcanized rubber, wherein 100 parts by mass of at least one rubber component selected from natural rubber and/or diene base synthetic rubbers are compounded with 55 to 200 parts by mass of silica and 0.5 to 15 parts by mass of at least one of alkanolamines represented by the following Formula (I):

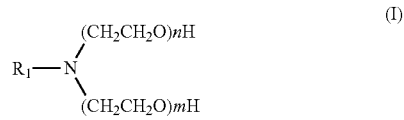

[in Formula (I), $R_1$ represents an alkyl group or an alkenyl group having 1 to 24 carbon atoms, and the alkyl group and alkenyl group may be any of a linear group, a branched group or a cyclic group; m and n represent an average addition molar number, and m and n are numerical values which represent m+n=1 to 20].

8. The viscosity lowering method for an unvulcanized rubber as described in claim 7, wherein the unvulcanized rubber is further compounded with a silane coupling agent.

9. The viscosity lowering method for an unvulcanized rubber as described in claim 8, wherein a compounding amount of the silane coupling agent is 1 to 20 parts by mass based on 100 parts by mass of silica.

10. The viscosity lowering method for an unvulcanized rubber as described in claim 7, wherein a compounding amount of the alkanolamine is 0.5 to 20 parts by mass based on 100 parts by mass of silica.

11. The viscosity lowering method for an unvulcanized rubber as described in claim 7, wherein $R_1$ has 11 to 18 carbon atoms, and m+n is 2 to 5.

* * * * *